United States Patent [19]

Brigante

[11] Patent Number: 4,490,252

[45] Date of Patent: Dec. 25, 1984

[54] ELECTROSTATIC SCALE CONTROL APPARATUS FOR FEED WATER HAVING ROTATING HELIX RESPONSIVE TO WATER FLOW RATE

[76] Inventor: Miguel F. Brigante, Calle el Retiro Quinta Caney el Rosal, Caracas, Venezuela

[21] Appl. No.: 227,930

[22] Filed: Jan. 23, 1981

Related U.S. Application Data

[63] Continuation of Ser. No. 672,819, Apr. 1, 1976, abandoned.

[51] Int. Cl.³ .............................................. B01D 35/06
[52] U.S. Cl. .................................... 210/222; 210/354; 210/695
[58] Field of Search ............... 210/695, 222, 223, 354, 210/355; 415/72; 204/155, 186, 302

[56] References Cited

U.S. PATENT DOCUMENTS

| | | | |
|---|---|---|---|
| 2,125,532 | 8/1938 | Wells | 210/355 X |
| 2,596,743 | 5/1952 | Vermeiren | 210/222 |
| 2,652,925 | 9/1953 | Vermeiren | 210/222 |
| 3,228,878 | 1/1966 | Moore | 210/695 |
| 3,950,807 | 4/1976 | Sanderson | 210/222 |
| 4,226,720 | 10/1980 | Brigante | 210/222 |

FOREIGN PATENT DOCUMENTS 145850 3/1952 Australia .
701970 1/1965 Canada .............................. 210/695
1232948 5/1971 United Kingdom ............... 210/222

Primary Examiner—John Adee
Attorney, Agent, or Firm—A. A. Saffitz

[57] ABSTRACT

A magnetic apparatus comprising an electromagnetic coil surrounding a feed water inlet tube, having an electrical D.C. winding about the tube and a ferromagnetic helix closely fitting within the inside of the tube rotating in response to water pressure. The magnetic helix which rotates in response to water flow in the casing fits quite closely to the inner wall of the tube, the helix being only slightly smaller than the inside diameter of the tube to thereby create a flow directed tangentially along the tube surface the helix further creates an induced electromagnetic field interaction with the winding to direct the magnetic lines of force within the casing. This combines electromagnetic forces and water flowing forces to prevent calcareous deposition along the walls of said casing and to assist in keeping the walls of deposits. The impeller is formed of a helical band rotating on a shaft which is journalled on a finned support which is fitted within the pipe at a wider diameter where it tapers to a narrower diameter so that the impeller unit can be withdrawn from the tube by pulling it back in the wider inner portion of the feed water inlet tube against the direction of the water flow. Thus the tapered feed water inlet tube serves to lock the impeller unit in place.

1 Claim, 2 Drawing Figures

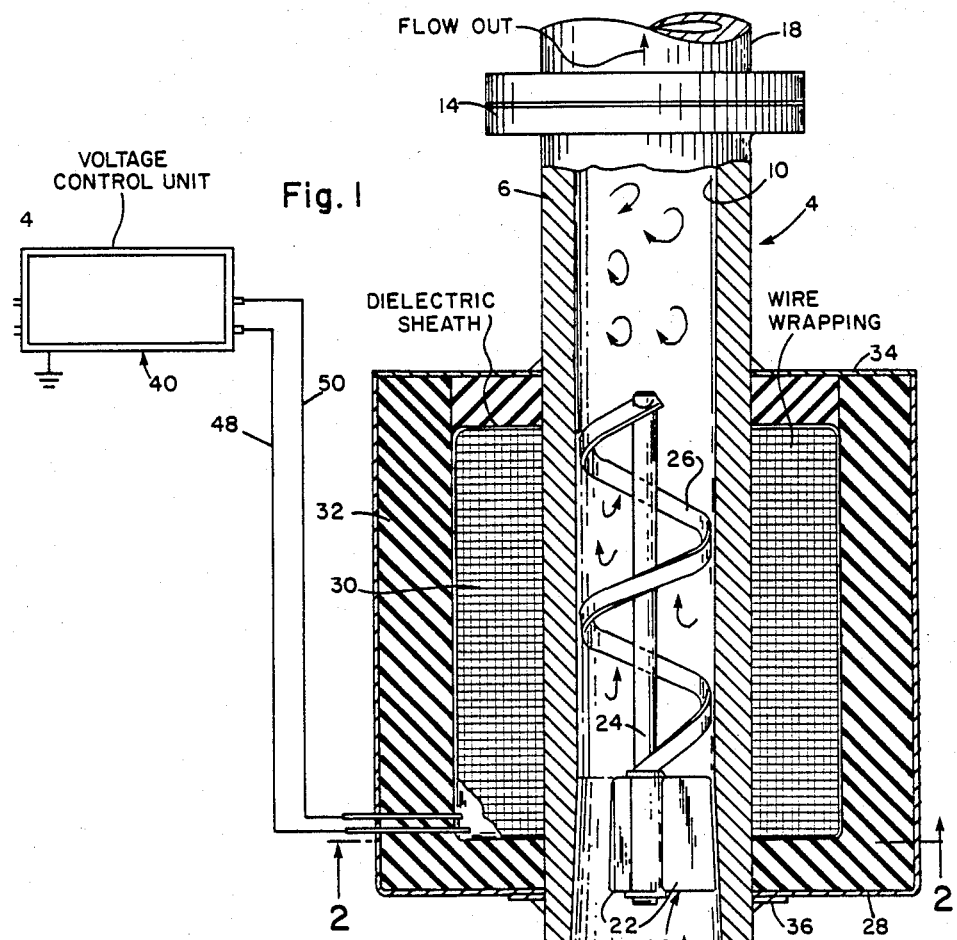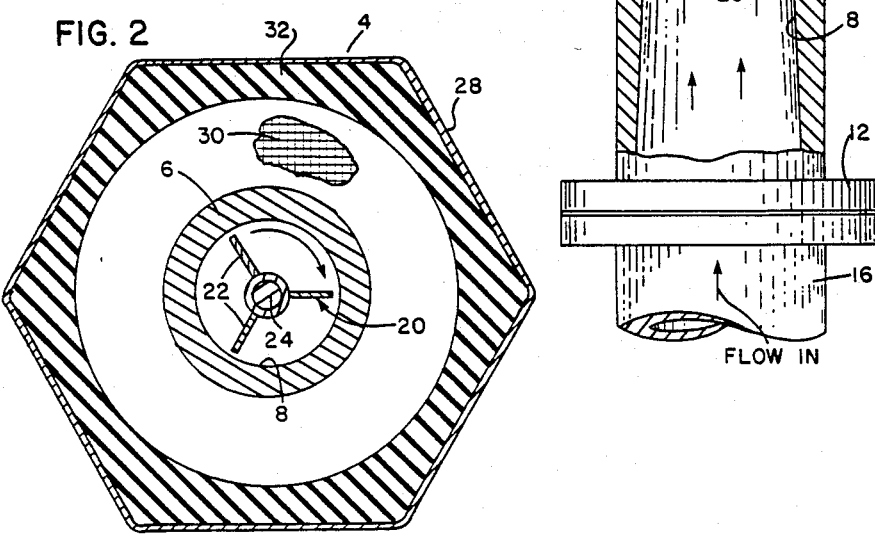

ELECTROSTATIC SCALE CONTROL APPARATUS FOR FEED WATER HAVING ROTATING HELIX RESPONSIVE TO WATER FLOW RATE

This is a continuation of application Ser. No. 672,819, filed Apr. 1, 1976, abandoned.

SUMMARY OF THE INVENTION

The subject matter of the present invention is directed to the problem of overcoming boiler scale buildup in flowing water systems for boilers to remove and inhibit deposition of calcareous deposits from the water by the generation of mechanical forces imparted by an impeller having a helical band formed of a ferromagnetic material, which band is closely adjacent the inner wall of the feed water inlet tube of the boiler and of magnetic forces which are induced by surrounding the boiler feed water inlet tube with an electrical winding wrapped in a dielectric sheath about the outside of the tube. The power supplied to the winding of a DC voltage of from 4 to 20 volts at the output of a 220 or 110 volt AC to DC converter provides magnetic forces which are induced in the ferromagnetic band portion of the helix, these lines sweeping the inner wall at a rotational impeller speed which depends upon the water flow into the boiler.

BACKGROUND OF THE INVENTION

1. Field of the Invention

The present invention lies in the field of object protection by the application of an electrical field and also in the field of the magnetic treatment of feed water or similar liquids for the purpose of preventing the deposition of calcareous material, feed water scale or the like on the inner surfaces of conduits, casings, and the like, and is especially directed to the combined magnetizable impeller flow and magnetic field treatment of flowing water without recourse to chemical conditioning agents which have been heretofore employed to sequester, chelate, or solubilize the calcareous matter carried in the water.

2. Description of the Prior Art

For the purpose of passivation or of object protection of ferrous surfaces to inhibit corrosion by water flowing in contact with such surfaces, electrical fields and magnetic fields have been tried in many different parts of the world and for a long time.

For example, Cabell in U.S. Pat. Nos. 68,041, 71,451, 73,872, 304,989 and 409,136 has proposed the introduction of magnetic elements into the boiler to prevent calcareous scale build-up.

More recently, Vermieren in U.S. Pat. No. 2,652,925 and in Belgium Pat. No. 460,560 granted Nov. 30, 1945 describes a magnetic apparatus for water treatment to prevent calcareous deposits in which several elongated electromagnets are placed in a cylindrical casing and the water passes first upwardly between and around these electromagnets from an incoming central axial path, out and around, then downwardly and finally again upwardly on the outside of the electromagnets to thereby provide a sinuous and turbulent flow path which also aids in preventing encrustation. This magnetic device is sold commercially throughout the world.

Electrostatic treatment has also been widely practiced as shown for example in the British Pat. Nos. 601,576 and 601,580 published May 7, 1948 both granted to the Dubilier Condenser Company, and in the following typical U.S. Pat. Nos.: Heller, 3,256,168; Banks, 3,379,629, Locke et al, 3,409,530, Bremerman, 3,620,951, Evans, 3,798,142.

During the past few years an electrostatic scale control device has been marketed by Worthington Corporation, Harrison, N.J., and is described in an article in 1973 in Plant Engineering Magazine by Leo Spector, Managing Editor, the article entitled, "Breakthrough in Fluid Technology", "Electrostatic Scale Control". This Worthington device consists of two main elements: a cylindrical chamber through which the untreated water flows and a voltage control unit. At the center of the chamber is a wire-wrapped core covered by a dielectric sheath; it is the positive electrode. The outer metal shell serves as the negative electrode. Water enters the chamber at the bottom and spirals around the core as it travels upward to the outlet. While the water is in the chamber, it is subjected to an electrostatic field of 3,400 volts. Power requirement if negligible (about 2 to 3 microamps as a result of dielectric losses); it's the static-field voltage that does the trick. The unit works best with untreated water. It is not recommended for use with water that has been softened or chemically treated, nor at liquid temperatures over 190° F. The unit was successfully applied to promote scale removal and inhibit its formation in compressor and engine cooling jackets, heat exchangers, hot and cold water lines, air conditioning systems and a host of other traditional, as well as untraditional, situations. In each instance, water flow and heat transfer properties were improved and maintenance problems either minimized or eliminated.

One of the difficulties with the unit is scale removal is slow and takes several months even though it is abetted by the spiral water flow pattern.

OBJECTS OF THE INVENTION

An object of the invention is to improve the performance of the water treatment device proposed in the Worthington electrostatic scale controller while cutting the costs and especially to enhance scale removal by providing straight-line "standard-schedule" pipe fitted with standard flanges at the ends thereof.

A further object is to provide improved performance by mounting an impeller means formed of magnetic material in a helical band form about a shaft journalled on a finned bearing in the casing. The helix diameter is only slightly smaller than the inside diameter of the casing so that the impeller means is driven into rotational movement by the straight line water flow through the casing, the higher the flow rate the faster the rotation. As a result of the close clearance electromagnetic force lines are simultaneously generated and helically swirling forces are also created by the rotation of the helical band and by providing a winding which surrounds the casing and supplying this winding with a power source including DC voltage and voltage control means whereby the magnetic field is impressed throughout the cross section of the casing and turbulence is created by the rotation of the impeller means.

Accordingly, still a further object is to provide improved water treatment by combining electrical forces and magnetic forces along a straight through path in casing through which water flows and simultaneously providing an impeller means formed of a helical band journalled on a finned support with a close tolerance between the outer periphery of the band and the inner surface of the casing thereby creating turbulence during the straight flow of the water through the casing.

Other and further objects will become apparent from the more detailed description and drawings.

BRIEF DESCRIPTION OF THE DRAWINGS

FIG. 1 is a diagrammatic vertical sectional view of the water conditioning apparatus of the present invention; and, FIG. 2 is a transverse section, taken on line 2—2 of FIG. 1.

DESCRIPTION OF THE PREFERRED EMBODIMENT

As shown in FIG. 1, the electrostatic control apparatus of the invention comprises a water conditioner unit 4, consisting of a casing 6 through which the water flows along straight bore 10, a cabinet 34 for the electrical winding 30 which surrounds the casing 6, a power source 42 with its voltage control unit 40 for energizing the winding 30, and an impeller means 20 which rotates in response to the flow of water shown by arrows pointing from the bottom towards the top within straight bore 10.

The helical band 26 of the impeller means is mounted at its upper end and at its lower end on shaft 24 which in turn is journalled on the finned support 22 for rotational movement.

The casing 6 and lower flanges 12 and upper flanges 14 are all off-the-shelf standard schedule fittings which brings down the cost of the present unit in comparison with other units requiring welded elbow fittings at top and bottom of the treatment unit.

The following table illustrates the dimensions which have been found to be especially desirable:

| Model | $L_1$ | $L_2$ | $L_3$ | $L_4$ |
|---|---|---|---|---|
| 5001 | 12″ | 1″ | 12″ | 0.9 |
| 5002 | 14″ | 1¼″ | 12″ | 1.0 |
| 5003 | 16″ | 1½″ | 14″ | 1.0 |
| 5004 | 18″ | 2″ | 16″ | 3.2 |
| 5005 | 20″ | 2½″ | 16″ | 3.5 |
| 5006 | 22″ | 3″ | 18″ | 3.5 |
| 5007 | 24″ | 4″ | 20″ | 5.3 |
| 5008 | 34″ | 6″ | 35″ | 10.0 |
| 5009 | 34″ | 8″ | 40″ | 12.0 |

$L_1$: Length between flanges coupling in inches
$L_2$: Inside diameter of the cabinet 34 in inches
$L_3$: External diameter of the cabinet in inches
$L_4$: Amperage consumption referring to 110 volts input.

In the preferred embodiment illustrated herein in FIGS. 1 and 2, the casing 6 is standard schedule 80 high pressure pipe with standard flanges mounted at the ends. In this embodiment a conical insert may be introduced (not shown) which has the effect of imparting greater velocity to water flow by a Venturi effect.

The finned support 22, the helical band 26, the shaft 25, and the journalled mounting are formed of corrosion resistant electromagnetic metals which can withstand high temperatures, e.g. up to 900° F. The pitch of the helical band 26 is such as to respond immediately to the water pressure and the electrical winding 30 is so designed and arranged to impress a DC static field uniformly throughout the casing. The electrical winding 30 is provided with adequate insulation 30, so that the underwriters requirements for this type of equipment is met. As shown in FIG. 1, the cabinet 34 is joined by welding to the casing 6, but it is within the scope of the invention to use a separabel cabinet which may be secured to a concentric mounting plate projecting from the pipe, thereby making the cabinet easily removable from the casing.

Temperature and corrosion resistant magnet alloys for making the impeller are well known; examples are magnet steels, chromium steels, tungsten steels. Ferrites may be used such as bariem ferrite. Magnetic alloys based on copper may be used such as Cunico and Cunife. The compositions of these steels and alloys are shown at pages 780 and 782 of Metals Handbook, 8th Edition published by the American Society of Metals, Metals Park, Novelty, Ohio, 1961.

The voltage control unit 40 in the preferred embodiment is a standard unit which combines a transformer or converter for converting line voltage 220 or 110 volts AC into DC voltage and which provides for converting the DC voltage from the step down AC voltage input.

It is preferred to operate at DC voltage between 4 to 20 volts in order to achieve optimum low cost operation.

As mentioned above other mounting means than by welding the cabinet 34 to the casing 6 may be employed, e.g., snap rings above and below the cabinet for easy dismantling or still other retaining means.

The impeller unit 20 is portable and is readily mounted within the casing 6 for rotational movement in response to water flow rate, the bottom forming a conical section which aids in imparting rotational movement to the helical band.

What I claim is:

1. A magnetic apparatus for treating feed water in a boiler feed water inlet tube subject to scale, comprising:

an electromagnetic coil formed of an electrical winding energized by DC voltage surrounding said inlet tube creating magnetic forces within the tube;

an elongated impeller consisting of a helical band formed of ferromagnetic material, a central rotatable shaft supporting said band about which said band extends along the length thereof and a stationary finned bearing at the rear of said shaft supporting said shaft for rotating movement which orients said helical band and shaft along the direction of water flow from the rear of the bearing to the tip of the shaft and band whereby said band and shaft rotate in said bearing in response to straight through flow of water through said inlet tube into the boiler;

said helical band having a diameter which is only slightly narrower than the inner diameter of said inlet tube to fit closely in proximity to the inner surface of said tube thereby directing in-flowing water tangentially in a swirling motion from said band to the inner surface of said tube as a result of water flow through said tube;

tapered means in said tube which extend approximately the length of said shaft and said helical band having a widened inner portion at the rear of said impeller in said tube whose width is about the width of said finned bearing but said finned bearing being wider than the tapered portion whereby said impeller is locked at the finned bearing in a rear location of the tapered bearing so that water flowing in said tube is directed toward said helical band at the front of the impeller to lock the impeller where the taper position narrows; and a D.C. energy source consisting of an A.C. to D.C. converter which converts 110 to 220 volts A.C. to 20 volts D.C. energizing said electrical winding to generate magnetic lines of force within the electromagnetic coil surrounding said tube, said magnetic lines of force acting simultaneously with the swirling movement of the feed water imparted by rotation of the ferromagnetic helical band on the shaft.

* * * * *